G. T. PINE.
SEED PLANTER.
APPLICATION FILED MAY 17, 1909.
935,546.
Patented Sept. 28, 1909.
2 SHEETS—SHEET 1.
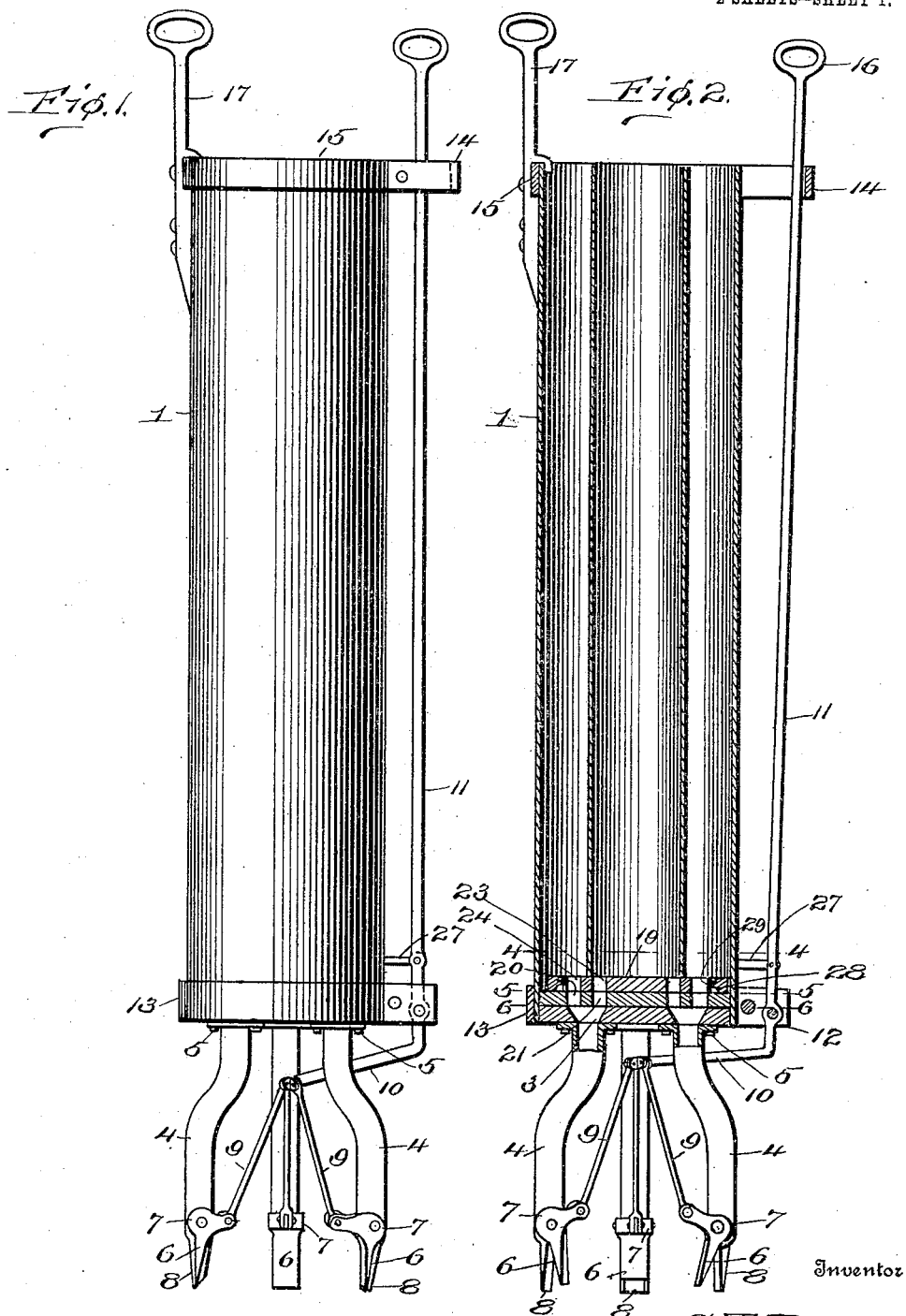
Witnesses
J. M. Fowler Jr.
C. H. Griesbauer
Inventor
G. T. Pine
by H. B. Willson & Co
Attorneys

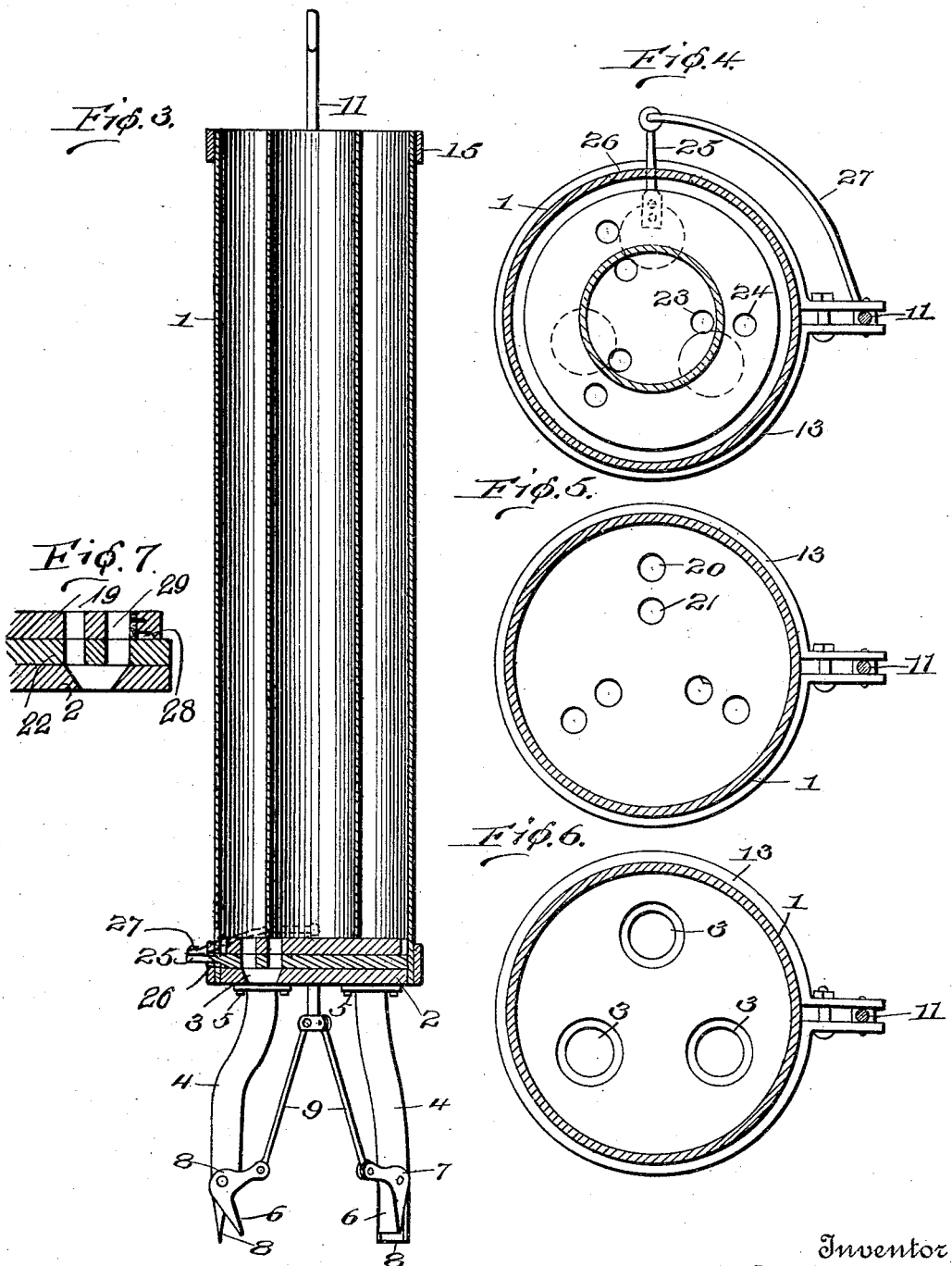

UNITED STATES PATENT OFFICE.

GEORGE T. PINE, OF SCOTT DEPOT, WEST VIRGINIA.

SEED-PLANTER.

935,546.  Specification of Letters Patent.  Patented Sept. 28, 1909.

Application filed May 17, 1909. Serial No. 496,364.

*To all whom it may concern:*

Be it known that I, GEORGE T. PINE, a citizen of the United States, residing at Scott Depot, in the county of Putnam and State of West Virginia, have invented certain new and useful Improvements in Seed-Planters; and I do declare the following to be a full, clear, and exact description of the invention, such as will enable others skilled in the art to which it appertains to make and use the same.

This invention relates to improvements in combined seed planters and fertilizer distributers.

The object of the invention is to provide an improved construction of seed planter adapted to be carried and operated by hand and by means of which the seeds are evenly placed in the hills at proper distances apart.

A further object is to provide a seed planter of this character having in connection therewith a fertilizer distributing mechanism adapted to be operated simultaneously with the seed dropping mechanism to discharge a suitable quantity of fertilizer with each seed planted.

With the foregoing and other objects in view, the invention consists of certain novel features of construction, combination and arrangement of parts, as will be more fully described and particularly pointed out in the appended claims.

In the accompanying drawings, Figure 1 is a side view of a planter constructed in accordance with the invention, showing the seed depositing jaws in closed position; Fig. 2 is a central vertical sectional view, showing the seed depositing jaws in open position; Fig. 3 is a similar view taken at right angles to Fig. 2; Fig. 4 is a transverse sectional view on the line 4—4 of Fig. 2; Fig. 5 is a similar view on the line 5—5 of Fig. 2; Fig. 6 is a similar view on the line 6—6 of Fig. 2, and Fig. 7 is an enlarged fragmentary sectional view.

In the embodiment of my invention, I provide a suitable seed receptacle or hopper 1, which is here shown and is preferably of cylindrical form open at its upper end and closed at its lower end by a suitable closing plate or bottom 2 which is preferably fitted into the lower end of the hopper and secured therein in any suitable manner. In the bottom plate 2 is formed a series of seed and fertilizer discharging passages 3 which are preferably flared outwardly at their upper ends, as shown.

Secured to the underside of the bottom plate 2 beneath each of the discharge openings 3, is a seed tube 4, said tubes being provided on their upper ends with annular flanges which receive fastening bolts 5 inserted through the bottom plate 2 whereby the tubes 4 are securely held in operative position. Any desired number of discharge openings and tubes may be arranged on the bottom of the hopper, three of the same being shown in the present instance as the preferred number, and said tubes and openings are arranged at equal distances apart. The tubes 4 are bent outwardly so that the lower ends of the same are a considerably greater distance apart than the upper ends. On the lower ends of the tubes are formed seed depositing jaws 6, one member 7 of which is pivoted on the side of the tube and said pivoted member is adapted to be opened and closed against the fixed or stationary member 8 of the jaws to discharge the seeds from the tubes at the proper time. The pivoted members 7 of the jaws have suitably connected thereto operating rods 9 which extend upwardly adjacent to the underside of the hopper 1 and are connected at their upper ends with the right angularly projecting end 10 of an operating lever 11 which is pivoted at its lower end between the apertured ears 12 of a clamping ring or band 13 arranged on the lower end of the hopper 1, as shown. The upper end of the lever 11 projects through and works in a guide loop 14 formed on one side of a clamping ring or band 15 arranged on the upper end of the hopper 1, as shown. On the upper end of the rod 11 is formed a handle 16 by means of which the lever may be swung inwardly and outwardly to raise and lower the right angularly bent end 10 thereof, thus opening and closing the hinged members of the jaws 6.

Secured to the upper end of the hopper 1, opposite to the operating lever 11 is a stationary handle 17. By means of the handles 16 and 17, the planter is carried and the lower ends of the seed tubes 4 projected into the ground and the jaws 6 opened to deposit the seed in the openings formed in the ground by the insertion of the ends of the tubes.

Suitably secured in the hopper 1 is a centrally disposed cylindrical fertilizer hopper 18, the lower end of which is in engagement with an upper plate 19 forming part of a seed and fertilizer distributing mechanism.

The seed distributing mechanism comprises the plate 19 which is secured to the inner sides of the hopper a suitable distance above the main bottom 2 and in said plate 19 is formed a series of seed and fertilizer distributing passages 20 and 21, said passages being arranged in pairs and spaced equal distances apart around the plate 19 and out of alinement with the passages or apertures 3 in the bottom 2. Mounted to turn on the bottom 2, between the same and the plate 19, is a valve disk 22 in which is formed seed and fertilizer discharging passages 23 and 24 which are adapted to be brought into and out of alinement with the apertures 20 and 21 and the discharge passages 3 when the valve disk 22 is turned or oscillated. It will be understood that the seed and fertilizer discharging passages 20 and 21 in the plate 19 communicate respectively with the seed and fertilizer hoppers so that when the seed and fertilizer apertures in the valve disk are brought beneath or in alinement with the apertures 20 and 21, the seed and fertilizer will enter the apertures 23 and 24 through the openings 20 and 21 in the plate 19. After the apertures in the valve disk have thus received the seed and fertilizer, the disk is turned to bring the apertures 23 and 24 out of alinement with the apertures 20 and 21 in the plate 19 and into alinement with the discharge apertures 3 in the bottom 2, thus permitting the seed and fertilizer to be discharged through the tubes 4 and in the jaws 6 whereby when the latter are opened, the seed and fertilizer will be deposited into the ground.

The valve disk 22 may be operated in any suitable manner, but said disk is here shown and is preferably provided with a laterally projecting stem 25 which extends through a slot 26 formed in one side of the hopper 1 and is connected at its outer end by an operating rod 27 to the lever 11 whereby when said lever is operated to open the jaws 6, the valve disk will be moved to bring the apertures 23 and 24 opposite to the apertures 20 and 21 in the feed plate 19 and the seeds previously discharged into the tubes 4 and jaws 6, will be deposited into the ground. When the lever 11 is moved in the opposite direction to close the jaws 6, the valve disk will be turned to bring the passages 23 and 24 opposite to the discharge openings 3, thus letting the next discharge of seed and fertilizer into the tubes 4.

While I have herein shown and described the planter as being provided with the fertilizer hopper and discharging mechanism, it is obvious that these parts may be dispensed with and the device used simply for planting seeds.

The distributing passages 21 in the feed plate 19 are preferably hollowed out at their lower edges and on one side, as shown at 28, and to said hollowed edge of the passages is secured a brush 29, said brushes being adapted to engage the valve disk 22. By this arrangement, the seed in the passages 21 are held back and only the proper quantity of seed permitted to enter the passages 23 of the valve disk, and the seed are prevented from being broken between the edges of the passages in the plate 19 and disk 22 when the passages are moved into and out of alinement.

The seed apertures 23 in the valve disk are preferably of such size as to contain but one seed, while the fertilizer apertures 24 are of such size as to contain a suitable amount of fertilizer to be discharged with each seed and by arranging the discharge tubes 4 as herein described, three seeds will be deposited in each hill at proper distances apart thus dispensing with the necessity of thinning out the plants from the hills which must be done when the seeds are planted promiscuously. The seeds when deposited as herein before described, are at sufficient distances apart in the hill to permit the growing of three stalks instead of two, as is the customary practice thus greatly increasing the yield of the hills.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a planter of the character described, the combination with a seed hopper, of a fertilizer hopper arranged therein, a bottom arranged in the lower end of said hopper, said bottom having formed therein a series of seed and fertilizer discharging passages, a series of seed and fertilizer discharging tubes connected with the apertures in said bottom, depositing jaws arranged on the lower ends of said tubes, a seed discharging mechanism arranged in said seed hopper and connected with the fertilizer hopper, whereby the seed and fertilizer in said hoppers are simultaneously discharged into said tubes, and a hand operating mechanism connected with said feeding mechanism and depositing jaws, whereby said parts are simultaneously operated.

2. In a seed planter of the character described, the combination with a seed hopper having a stationary handle, of a fertilizer hopper arranged in said seed hopper, an apertured bottom arranged in said seed hopper, discharge tubes connected with said apertures, seed depositing jaws pivoted to the lower ends of said tubes, a feed plate arranged in said hopper above the apertured bottom thereof, said feed plate having formed therein a series of discharge passages communicating with said fertilizer hopper and seed hopper, a valve disk pivotally mounted between said feed plate and apertured bottom of the hopper, said disk having formed therein a series of discharge passages adapted to be alternately brought into alinement with the apertures in said feed plate and the discharge apertures in the bottom of the hopper, whereby seed and fertilizer are taken from said hoppers and discharged into said tubes, an operating lever pivotally mounted on said seed hopper, operating rods to connect said lever with said depositing jaws, an operating rod to connect the lever with said valve disk, and a handle arranged on the upper end of said lever whereby the same is actuated.

3. In a planter of the character described, the combination with a seed hopper, of a series of discharge tubes connected with the lower end of said hopper, depositing jaws arranged on the lower ends of said tubes, a feed plate arranged in the lower end of said hopper, said plate having formed therein a series of discharge passages, said passages having their lower edges hollowed out at one side, brushes arranged in said passages, adjacent to said hollowed edges, a valve disk pivotally mounted between said feed plate and the bottom of the hopper, said valve disk having formed therein a series of discharge passages adapted to be alternately brought into and out of alinement with the passages in said feed plate and the upper ends of said discharge tubes, an operating lever and means to connect said lever with said valve disk and said depositing jaws whereby said disk and jaws are operated.

In testimony whereof I have hereunto set my hand in presence of two subscribing witnesses.

GEORGE T. PINE.

Witnesses:
G. D. BRYAN,
G. B. HANDLEY.